United States Patent [19]

Oishi et al.

[11] Patent Number: 4,861,746

[45] Date of Patent: Aug. 29, 1989

[54] CATALYST FOR HYDROTREATING HEAVY HYDROCARBON OILS AND A METHOD OF PREPARING THE CATALYST

[75] Inventors: Yasuyuki Oishi; Akira Inoue, both of Yokohama, Japan

[73] Assignees: Nippon Oil Co., Ltd., Nishi-Shimba; Petroleum Energy Center Foundation, Koji, both of Japan

[21] Appl. No.: 148,986

[22] Filed: Jan. 27, 1988

[30] Foreign Application Priority Data

Feb. 6, 1987 [JP] Japan .................................. 62-24878

[51] Int. Cl.$^4$ ........................ B01J 23/22; B01J 23/24; B01J 23/74
[52] U.S. Cl. .................................... 502/314; 502/204; 502/206; 502/207; 502/247; 502/254; 502/255; 502/259; 502/260; 502/306; 502/308; 502/315; 502/321; 502/322; 502/323; 502/328; 502/332; 502/335; 502/337; 502/353; 502/354; 208/251 H

[58] Field of Search ............... 502/255, 314, 315, 321, 502/337, 204, 206, 207, 247, 254, 259, 260, 306, 308, 322, 323, 328, 332, 335, 353, 354; 208/251 H

[56] References Cited

U.S. PATENT DOCUMENTS

| | | | |
|---|---|---|---|
| 4,455,390 | 6/1984 | Ting et al. ........................... | 502/314 |
| 4,483,942 | 11/1984 | Sekido et al. ..................... | 502/314 X |
| 4,495,308 | 1/1985 | Gibson ............................. | 502/314 X |
| 4,760,045 | 7/1988 | Oishi et al. ........................ | 502/321 |

*Primary Examiner*—W. J. Shine
*Attorney, Agent, or Firm*—Bucknam and Archer

[57] ABSTRACT

A catalyst for hydrotreating a heavy hydrocarbon oil which comprises a porous refractory inorganic oxide carrier component and at least one hydrogenating active metal component selected from nickel, cobalt and the like, the metal component concentration in the cross-section of the catalyst being the highest between the center of the cross-section and the periphery thereof.

5 Claims, 3 Drawing Sheets

Cross-Section of Catalyst (a)

(b)

Line Analysis by EPMA

4,861,746

CATALYST FOR HYDROTREATING HEAVY HYDROCARBON OILS AND A METHOD OF PREPARING THE CATALYST

BACKGROUND THE INVENTION

1. Field of the Invention

This invention relates to a catalyst for hydrotreating heavy hydrocarbon oils and more particularly to such a catalyst which is useful for removing sulfur compounds, nitrogen compounds and metallic compounds such as nickel and vanadium compounds, from the catalyst.

2. Description of the Prior Art

There is a recent world-wide tendency that petroleum products demanded are lighter fractions, resulting in raising problems as to the treatment of heavy hydrocarbon oils (heavy oils). Particularly, residual oils and the like which have been freed of useful lighter fractions, contain sulfur compounds, nitrogen compounds and metallic compounds in a very high concentration due to the concentration of these compounds therein. Methods for treating heavy oils to obtain lighter fractions therefrom include a method for hydrocracking and a method for fluid catalytic cracking. When the heavy oil is treated by the above method, the sulfur, nitrogen and metal compounds contained in the heavy oil are the cause for atmospheric contamination, degradation of performance of product oils or poisoning of catalysts.

Thus, it is increasingly important to hydrotreat heavy oils in order to remove therefrom the sulfur, nitrogen and metal compounds contained therein. The term "hydrotreat" used herein means to treat a feed catalytically under a hydrogen pressure in order to either convert the sulfur and nitrogen compounds in the feed to hydrogen sulfide, ammonia and the like for removal or cause the metal compounds to be deposited on the catalyst for removal. It is mainly light fractions and the like that have heretofore been subjected particularly to indirect desulfurization, and the feed so treated was that fraction which contained metal compounds in a small amount. Since, however, crude oils recently used worldwide as the feeds are heavier than the feed which has heretofore been used, such crude oils contain nickel, vanadium and other metal compounds in greater amounts, and processes for the direct desulfurization of residual oils have come to be very often carried out.

Problems raised at this point are as to the plugging of the pores of catalysts with metals and coke produced, whereby the catalytic activity is lowered and the operation of the apparatus hindered. Thus, in order to enable the apparatus to be operated in a stable manner, it is required that the metal compounds contained in heavy oils be effectively removed therefrom and catalysts having a long service life be developed.

In attempts to meet the above requirements, many proposals have been made. These proposals include a method for the prolongation of catalytic life which comprises using a catalyst carrier having pores of a uniform size or larger size in order to enable the metal-containing particles in the feed to diffuse as far as the interior of the catalyst so as to use the active sites located in the interior of the catalyst, a method comprising the use of a bimodal carrier having different distributions of pore size and a method comprising the selection of kinds of metals to be carried, the combination of the metals, and the adjustment of concentration of the metals.

These methods so proposed, however, do not necessarily solve the above problems.

The present invention was made in view of these problems.

The primary object of the present invention is to provide a catalyst for hydrotreating heavy oils, which will not be plugged in the pores with metals, coke and the like derived from the oils and will maintain the catalytic activity for a long period of time when used.

SUMMARY OF THE INVENTION

The present inventors made extensive studies in attempts to solve the above-mentioned problems and, as a result of their studies, they found that the catalytic activity and life of a catalyst will be improved by controlling the distribution of concentration of the active metal in the carrier, the present invention being based on this finding.

The hydrotreating catalyst of the present invention comprises a porous refractory inorganic oxide carrier and at least one hydrogenating active metal component supported on said carrier and selected from the group consisting of nickel, cobalt, molybdenum, vanadium and tungsten, the concentration of the hydrogenating active metal component in the cross-section of the catalyst being the highest between the center of the cross-section and the periphery (outer surface) thereof.

The catalyst of the present invention is characterized by the distribution of concentration of the specific hydrogenating active metal component supported on the porous refractory inorganic oxide carrier.

BRIEF DESCRIPTION OF THE DRAWINGS

This invention will be better understood by reference to the accompanying drawings in which.

DETAILED DESCRIPTION OF THE INVENTION

Figure 1:
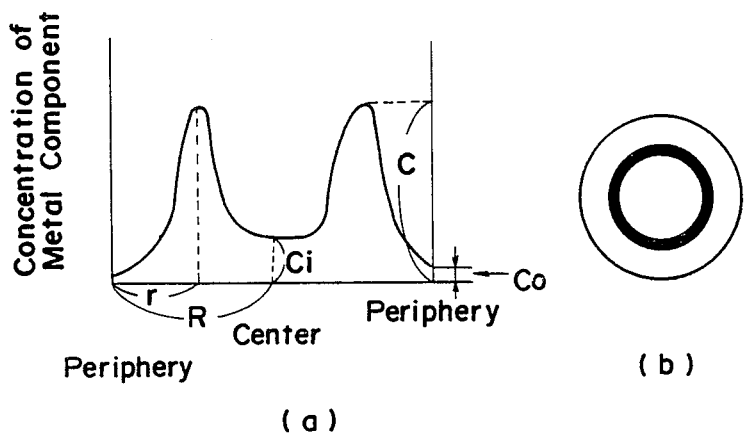
FIGS. 1(a) and 1(b) indicate the distribution of the metal component concentration in the interior of the catalyst of this invention and the cross-section thereof.

Referring now to FIG. 1(b), the active metal component is present in the highest concentration in the band- or ring-like region located at a fixed distance from the outer face of the catalyst and at a fixed distance from the center thereof, and the catalyst of this type is generally called "egg-white type" one. Such a catalyst is disclosed in "CATAL. REV.-SCI. ENG., 27(2) 207 (1985)". The catalyst disclosed in this literature is a catalyst in which platinum or the like is supported on a carrier, and it cannot be used as the catalyst for heavy hydrocarbon oils having a high content of metals and sulfur.

As is shown in FIG. 1(a), the catalyst of this invention is such that the concentration of the hydrogenating active metal component in the cross-section of the catalyst is the highest between the center of the cross-section and the periphery (outer surface) thereof. The most concentrated portion (peak) of the active metal component is located in the region so defined as to meet the conditions that r/R is preferably 0.01–0.9, more preferably 0.1–0.7, assuming that the shortest distance between the periphery of the cross-section and the center thereof is R, and the shortest distance between the periphery of the cross-section and the peak of concentration. In cases where the value of r/R is less than 0.01, the catalyst will be plugged at its pores near the outer surface thereof with metals, coke and the like thereby to shorten the life of the catalyst, whereas in case where the value of $\gamma/R$ is more than 0.9 the catalyst will decrease in catalytic activity, particularly demetallizing activity.

Further, the active metal component concentration near the outer surface of the catalyst is preferably in the range of Co/C being 0 to 0.5 assuming that the highest concentration of the metal component is C and the metal component concentration in the outer surface of the catalyst is Co, whereas the active metal component concentration near the center of the catalyst is preferably in the range of Ci/C being 0–0.8 assuming that the highest concentration is C and the concentration in the center of the catalyst is Ci.

The carriers used in this invention are refractory ones and are preferably porous refractory inorganic oxides. They include Group II metals, Group III metals and Group IV metals of the Periodic Table. More particularly, they include silica, alumina, magnesia, zirconia, thoria, boria, strontia and hafnia, and they may be used singly or jointly. Among them, alumina, silica-alumina, silica-magnesia and alumina-magnesia are preferable with alumina being particularly preferable. Alumina having $\gamma$, $\delta$, $\eta$, $\chi$ or the like crystal structure is preferred.

The hydrogenating active metal components which are to be supported on the above carriers according to this invention, include nickel, cobalt, molybdenum, vanadium and tungsten, and they may be used singly or jointly. These metal components may be used in the form of a metal, oxide, sulfide or the like.

The average concentration of a metal to be supported on a carrier is 0.1–20 wt. %, preferably 0.5–15 wt. %, as the metal. In cases where at least two kinds of metal components are to be supported, the concentration of each of the metal components is also within the above range.

The method for the preparation of the catalyst of this invention is not particularly limited, and a method comprising competitive adsorption may be illustrated. This method is one which enables hydrogenating active metal components to be distributed in any optional parts within a carrier. In cases where this method is carried out using an impregnation technique, an impregnating liquid is incorporated with a metal component and with an organic acid such as citric, tartaric, oxalic, maleic, acetic or phosphoric acid, a mineral acid such as hydrochloric or nitric acid, or an inorganic salt such as ammonium fluoride or ammonium chloride. These acids and inorganic salts may be added to the impregnating liquid in an amount by weight of 0.01–20%, preferably 0.1–10%.

The catalyst of this invention has a specific surface area of 2–400 m²/g, preferably 100–300 m²/g, a bulk density of 0.3 – 1g/ml, preferably 0.4–0.8 g/ml, an average pore volume of 0.1–4 ml/g, preferably 0.3–1.0 ml/g, and an average pore diameter of 50–500 Å, preferably 80–300 Å. With respect to the distribution of pores of the catalyst, the pore size (diameter) is in the range of not larger than 1000 Å. It is the most suitable for the catalyst that the total volume of pores having a diameter of 80–500 Å is about 25–85% of the total volume of pores having a diameter of not larger than 1000 Å.

The catalyst may take any form, for example, a cylindrical form (0.5–2) mm dia.×(0.5–2) cm long, a spherical form 0.5–4 mm dia., a tablet form, a trefoil form or a quatrefoil form.

The heavy hydrocarbon oils used in this invention are those containing a substantial amount of distillation residues such as asphaltene and include crude oils, topped crude oils, atmospheric-pressure or reduced-pressure residual oils, deasphalted asphalt, coal-liquefied oils, as well as oils derived from shale oil, tar sand, gilsonite and the like. These heavy hydrocarbon oils have a sulfur content of 0.1–10 wt. %, a nitrogen content of 0.1–1 wt. % and 10–1000 ppm of heavy metals such as nickel and vanadium.

The hydrotreating conditions used in this invention are a temperature of 250–500° C., preferably 300–450° C., a pressure of 20–300 Kg/cm², preferably 70–200 Kg/cm², a hydrogen flow of 500–2000 Nm³/Kl of oil fed and a LHSV of 0.5–3 hr⁻¹.

The catalyst of this invention as indicated above will not be plugged at the pores near the outer surface thereof with metals, coke and the like even after used for a long period of time and will not substantially decrease in activity whereby the catalyst has a longer service life.

This invention will be better understood by the following Examples.

EXAMPLE

A solution of ammonium molybdate containing 8.0 wt. % of molybdenum and cobalt nitrate containing 4.0 wt. % of cobalt, was incorporated with ammonium fluoride in an amount of 4.0 wt. % of the solution.

An alumina carrier (400 g, based on alumina) the pores of which have been filled with an ion-exchange water, was immersed in 2 liters of the thus obtained solution at room temperature for 30 minutes. The carrier taken out from the solution was thoroughly drained out on its surface, dried at room temperature for 15 hours, further dried at 100° C. for two hours and then baked at 550° C. for 3 hours.

COMPARATIVE EXAMPLE

The procedure of Example 1 was followed except that the ammonium fluoride was not used.

ANALYSIS

The catalyst obtained in Example 1 had a pore volume of 0.70 l/g and an average pore diameter of 130 Å, the total pore volume of pores having a pore diameter of 80–300 Å being 80% of that of all the pores. This is approximately true with the catalyst obtained in Comparative Example. The above two catalysts had respective metal contents as shown in Table 1.

Figure 2:
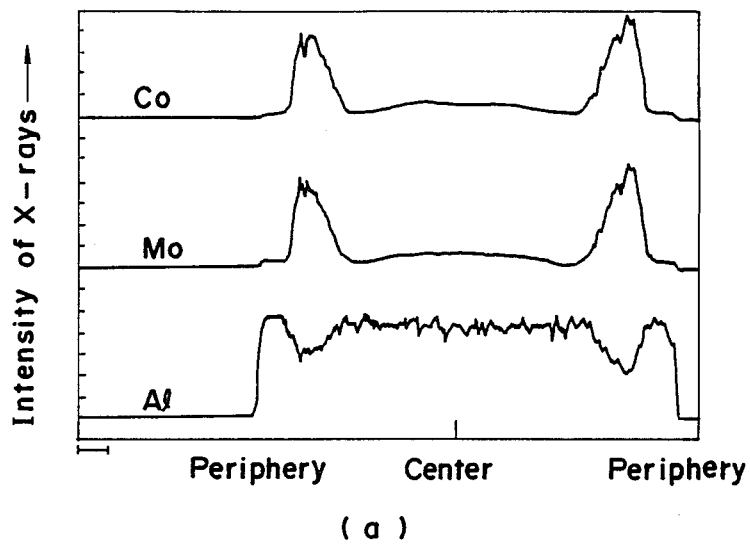
FIGS. 2(a) and 2(b) are diagrams showing the line analyses of catalyst particles obtained in the Example and Comparative Example, respectively.
Figure 2:
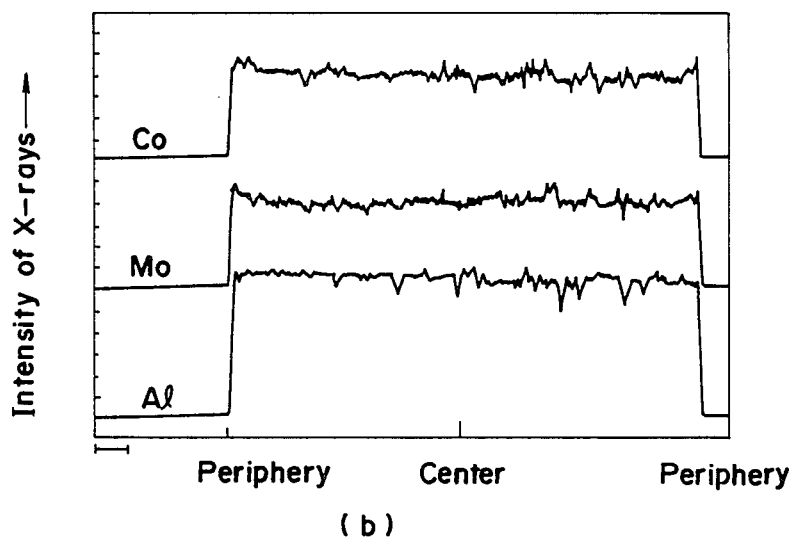

FIGS. 2(a) and 2(b) indicate the results of line analysis by EPMA of the sections of the particulate catalysts.

TABLE 1

|  | Example | Com. Example |
|---|---|---|
| MoO₃ (wt. %) | 11.1 | 11.0 |
| CoO (wt. %) | 3.0 | 2.5 |

FIG. 2(b) indicates that the metal is distributed throughout entire catalyst of the Comparative Example, whereas FIG. 2(a) indicates that the concentration of the metal in the catalyst of the Example is the highest inside the outer surface thereof.

ESTIMATION An experiment was made by hydrotreating a heavy oil (feed) using a fixed bed-type reactor. The reactor, inner dia. 20 mm $\phi \times$ length 2000 mm, was charged with 300 g of each of the catalysts and then used to hydrotreat the oil under the following reaction conditions.

| Partial pressure of hydrogen | 115 Kg/cm$^2$ |
| LHSV | 0.3 hr$^{-1}$ |
| Hydrogen/feed | 800 m$^3$/Kl |
| Hydrogen concentration | At least 90% |
| Reaction temperature | 400° C. |

The heavy oil used was Arabian Lite reduced-pressure residual oil having the following properties:

| Specific gravity d15/4° C. | 1.02 |
| Viscosity 100° C. | 1,130 cSt |
| Sulfur content | 4.5 wt. % |
| Nitrogen content | 0.2 wt. % |
| Nickel + Vanadium | 110 wt. ppm |
| Asphaltene | 6.9 wt. % |

Figure 3:
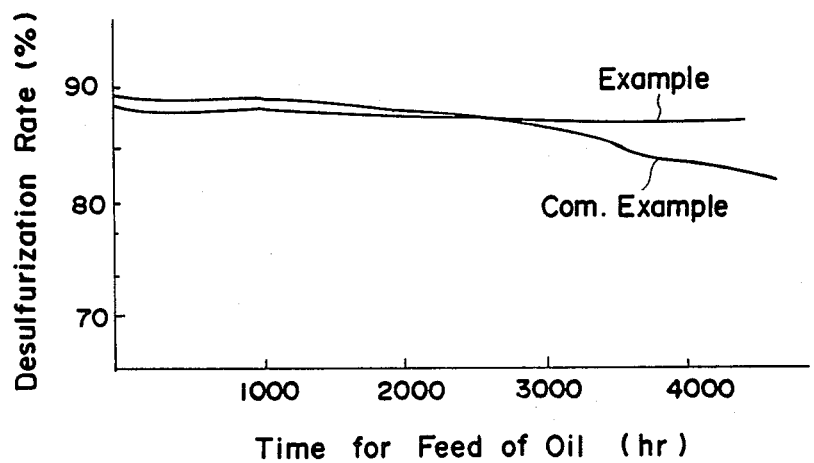
FIGS. 3 and 4 are diagrams showing the comparisons of the desulfurizing and demetallizing performances between the catalyst obtained in the Example and that obtained in the Comparative Example, respectively.
Figure 4:
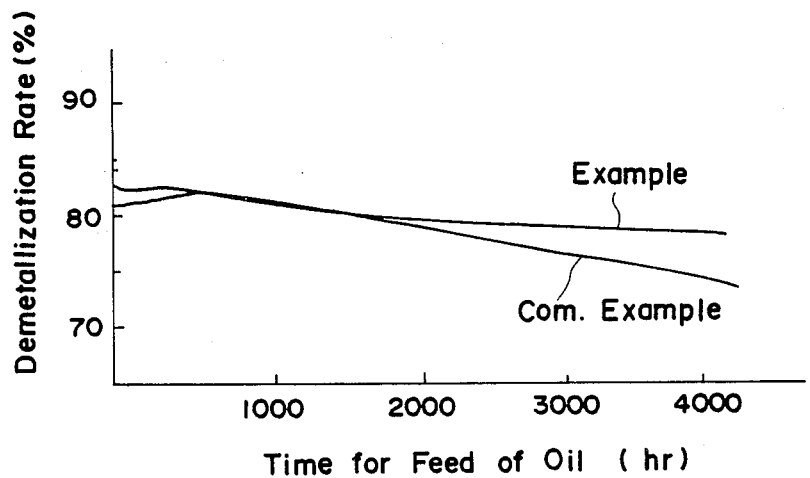

Evaluation was made by hydrotreating the heavy oil at a fixed temperature to obtain a hydrotreated oil which was then analyzed for desulfurization and demetallization rates. The results are as shown in FIGS. 3 and 4. FIG. 3 shows that the catalyst of the Example of the present invention exhibits a long-term stable desulfurization activity as compared with that of the Comparative Example although the catalyst of the Comparative Example in the initial stage exhibits a higher desulfurization rate than that of the invention Example. This will also apply to the demetallization rate.

What is claimed is:

1. A catalyst for hydrotreating a heavy hydrocarbon oil, comprising a porous refractory inorganic oxide carrier component and at least one hydrogenating active metal component which is a member selected from the group consisting of nickel, cobalt, molybdenum, vanadium and tungsten, wherein the highest concentration of the metal component in the cross-section of the catalyst is in the region between the center of the cross-section and the periphery thereof, said region being defined by r/R = 0.01-0.9, wherein R is the distance between the center of the cross-section and the periphery thereof; and r is the distance between said periphery and said region of the highest concentration, the concentration of the metal component at the periphery region of the cross-section is a value defined by Co/C = 0-0.5, and the concentration of the metal component in the center region of the cross-section is at a level defined by Ci/C = 0-0.8, wherein C is the highest concentration of the metal component, Co is the concentration of the metal component at the periphery of the cross-section and Ci is the concentration of the metal component in the center of the cross-section.

2. The catalyst according to claim 1 which as a specific surface area of 2-400m$^2$/g, a bulk density of 0.3-1 /g.ml, an average pore volume of 0.1-4 ml/g, and wherein 25-85% of the total pore volume has an average pore diameter of 80-500 Angstroms.

3. The method of preparing a catalyst which comprises a porous refractory inorganic oxide carrier component and at least one hydrogenating active metal component which is a member selected from the group consisting of nickel, cobalt, molybdenum, vanadium and tungsten, wherein the highest concentration of the metal component in the cross-section of the catalyst is in the region between the center of the cross-section and the periphery thereof, said region being defined by r/R = 0.0-0.9, wherein R is the distance between the center of the cross-section and the periphery thereof; and r is the distance between said periphery and said region of the highest concentration, the concentration of the metal component at the periphery region of the cross-section is a value defined by Co/C = 0-0.5, and the concentration of the metal component in the center region of the cross-section is at a level defined by Ci/C = 0-0.8, wherein C is the highest concentration of the metal component, Co is the concentration of the metal component at the periphery of the cross-section and Ci is the concentration of the metal component in the center of the cross-section, which consists of adding to an impregnating liquid a metal component which is nickel, cobalt, molybdenum, vanadium or tungsten. and (a) an organic acid which is citric, tartaric, oxalic, maleic, acetic or phosphoric acid or (b) an inorganic acid which is hydrochloric or nitric acid, or (c) an inorganic salt which is ammonium fluoride or ammonium chloride, said organic acid, inorganic acid or inorganic salt being in an amount of 0.01-20% by weight, immersing a carrier which is a member selected from the group consisting of silica, alumina, magnesia, zirconia, thoria, boria, strontia and hafnia and mixtures thereof in said impregnating liquid to obtain an impregnated carrier, and after 30 minutes, removing said impregnated carrier, draining it, drying it at room temperature, then drying at 100° C. and baking it at 550° C.

4. The method according to claim 3 wherein ammonium fluoride is added to said impregnating liquid.

5. The method according to claim 4 wherein alumina is impregnated with a 4% solution of ammonium molybdate, cobalt nitrate and ammonium fluoride.

* * * * *